Patented May 9, 1939

2,157,488

UNITED STATES PATENT OFFICE 2,157,488

PECTO PHENOLIC SYNTHETIC RESIN AND METHOD OF MAKING SAME

Richard Holzcker, Lake Wales, Fla.

No Drawing. Application October 27, 1936, Serial No. 107,903

2 Claims. (Cl. 260—10)

This invention relates to a new composition of matter of the class of synthetic resins and to the method of producing the same.

One of the objects of the present invention is to provide a pectin-phenolic condensation product capable of being molded into hard infusible and water-insoluble objects of good electrical insulating properties.

Another object of the invention is the profitable utilization of pectin-bearing vegetable waste such as citrus fruit pulp, apple pomace, beet pulp and similar materials in the production of an inexpensive, new and useful composition.

Still another object of the invention is the method of making synthetic resins from pectins and phenols.

Other objects of the invention will appear as the following description of a preferred and practical embodiment thereof proceeds.

It is, of course, established knowledge that pectic acid and its various compounds commonly known as pectins are found in various plant materials, especially a number of agricultural wastes, such as those mentioned above. From these materials the pectins may be readily extracted and in considerable quantities by treating them in acidulated water at a temperature near the boiling point of the latter. The solids obtained from the extract are readily hydrolyzed in acid media and the end product of such hydrolysis varies according to the hydrogen-ion concentration of the medium, yielding pectic acid, arabinose, or furfural.

If the extracts obtained by subjecting materials of comparatively high pectin content to the action of hot acidulated water are partially concentrated, a quantity of a phenolic compound added, and heating continued, condensation sets in and if the water present in the original mixture and formed during the reaction is removed at temperatures not exceeding 120° C., a viscous material is formed which is insoluble in water, but soluble in alcohol and other organic solvents.

Since repeated attempts to isolate furfural at various stages of the reaction have not been successful, the condensation is thought to set in when pectin is hydrolyzed to pectic acid or to arabinose, from which it is concluded that apparently no furfural is formed in the presence of phenol or phenolic compounds.

The appearance of the resins so formed depends greatly upon the nature of the condensing agent used. With the organic acids naturally present in the various raw materials, the color of the condensation products will vary from clear dark amber to dark brown. If inorganic acids are used, the color of the product will range from dark brown to jet black. The resins so formed have many of the characteristics of the phenol-aldehyde type.

In order to clearly describe my invention, I will now give an example. To 100 parts of pectin obtained by evaporation of an acid extract of citrus pulp, I add from 30 to 60 percent by weight of phenol and up to 10 percent of an acid. The mixture is then heated at a temperature approximating 100° C., for from one to four hours under limited refluxing, and then the temperature is raised to 120° C., and kept substantially at that point until practically all water has been removed. The amount of acid used greatly depends on the hydrogen-ion concentration; with the weaker acids larger quantities may be used.

Excess phenol may be removed by distillation under sub-atmospheric pressure, free acid may be neutralized and the product freely washed with water. At this stage the product is a viscous liquid stable at normal temperatures and adapted to be employed for a variety of purposes when dissolved in organic solvents. When solutions of the resin at this stage are allowed to evaporate, the resulting film will harden rapidly on exposure to the atmosphere.

If the viscous liquid obtained in the preceding steps of the process is subjected to further heat, it is readily transformed into an infusible, insoluble condition; application of pressure simultaneous with the heating will materially shorten the period of the transformation. Various fillers, pigments, etc., may be added to the resins while in the fusible stage and these mixtures formed and molded and when transformed into the insoluble infusible stage, these articles have good mechanical strength, are good electrical insulators and are resistant to most acids and dilute alkalis. When hardening agents (hexamethylenetetramine, hydrofuramide, etc.,) are incorporated in the molding mixtures, the final product will be materially improved and the curing time reduced.

It is to be understood that the above example is merely one of many formulae that may be employed in carrying out the process of my invention, and that wide variations in the quantities used, as well as in the time and temperature limits, may be made without departing from the spirit and scope of the invention on account of the wide fluctuations in the composition of the pectic materials and the type of condensation agent used, and as in some instances the percentages of unreactive substances present (fiber, fat, etc.) is but small, extraction may not be necessary and the raw materials may be used in their entirety.

What I claim is:

1. Synthetic resin, resulting from the condensation in a hot aqueous acid solution, of the pectous compounds extracted from pectous vegetable wastes in said solution, the condensation having been effected with phenol introduced into said solution.

2. Method of producing synthetic pectous phenolic resin characterized by the absence of furfural, comprising extracting the pectin from pectous-bearing vegetable wastes in acidulated water at approximately the boiling point of the water, concentrating the extract, adding a quantity of phenol to the concentrate, boiling the mixture of concentrate and phenol, producing autogeneous condensation of a water-insoluble pectin-phenolic compound, and evaporating the water at a temperature not exceeding 120° C.

RICHARD HOLZCKER.